United States Patent
Snyder

(10) Patent No.: US 6,688,821 B1
(45) Date of Patent: Feb. 10, 2004

(54) ADJUSTABLE CARGO AREA ORGANIZER SYSTEM

(76) Inventor: James F. Snyder, 10440 Ashley Oaks Dr., Riverview, FL (US) 33569

( * ) Notice: Subject to any disclaimer, the term of this patent is extended or adjusted under 35 U.S.C. 154(b) by 24 days.

(21) Appl. No.: 10/033,569

(22) Filed: Jan. 2, 2002

(51) Int. Cl.[7] ................................................. B60P 7/14
(52) U.S. Cl. ........................ 410/140; 410/121; 410/129; 410/151
(58) Field of Search ................................ 410/140, 121, 410/129, 151, 94; 220/528, 529; 224/403, 404, 42.33, 42.34; 296/24.1, 39.2, 37.6

(56) References Cited

U.S. PATENT DOCUMENTS

| | | | | |
|---|---|---|---|---|
| 4,986,706 A | * | 1/1991 | Williams, Jr. ............... | 410/129 |
| 5,265,993 A | * | 11/1993 | Wayne ........................ | 410/129 |
| 5,427,486 A | * | 6/1995 | Green ......................... | 410/118 |
| 5,697,742 A | * | 12/1997 | House ......................... | 410/129 |
| 5,709,512 A | * | 1/1998 | Smith ......................... | 410/129 |
| 5,971,685 A | * | 10/1999 | Owens ........................ | 410/151 |
| 5,975,819 A | * | 11/1999 | Cola ........................... | 410/129 |
| 6,089,804 A | * | 7/2000 | Bartelt ........................ | 410/140 |
| 6,109,847 A | * | 8/2000 | Patel et al. .................. | 410/129 |
| 6,138,883 A | * | 10/2000 | Jackson et al. | |
| 6,174,116 B1 | * | 1/2001 | Brand ......................... | 410/140 |
| 6,206,624 B1 | * | 3/2001 | Brandenburg ............... | 410/132 |
| 6,511,272 B2 | * | 1/2003 | Stafford ...................... | 410/121 |

\* cited by examiner

*Primary Examiner*—Stephen T. Gordon

(57) ABSTRACT

An adjustable cargo area organizer system for adjustably organizing a cargo area of a vehicle having at least a pair of opposed side walls orientated generally parallel to each other. The adjustable cargo area organizer system includes a partition assembly for portioning the cargo area of a vehicle into compartments. The partition assembly includes at least one panel that has a pair of opposed first end surfaces. Each of the opposed first end surfaces is selectively abuttable against the pair of opposed side walls of the vehicle. The panel has a front surface that has at least one elongated channel extending therein. At least one divider is provided that has an end that is slidably secured in the elongated channel. The divider subdivides one of the compartments of the cargo area into sub-compartments.

11 Claims, 2 Drawing Sheets

FIG. 1
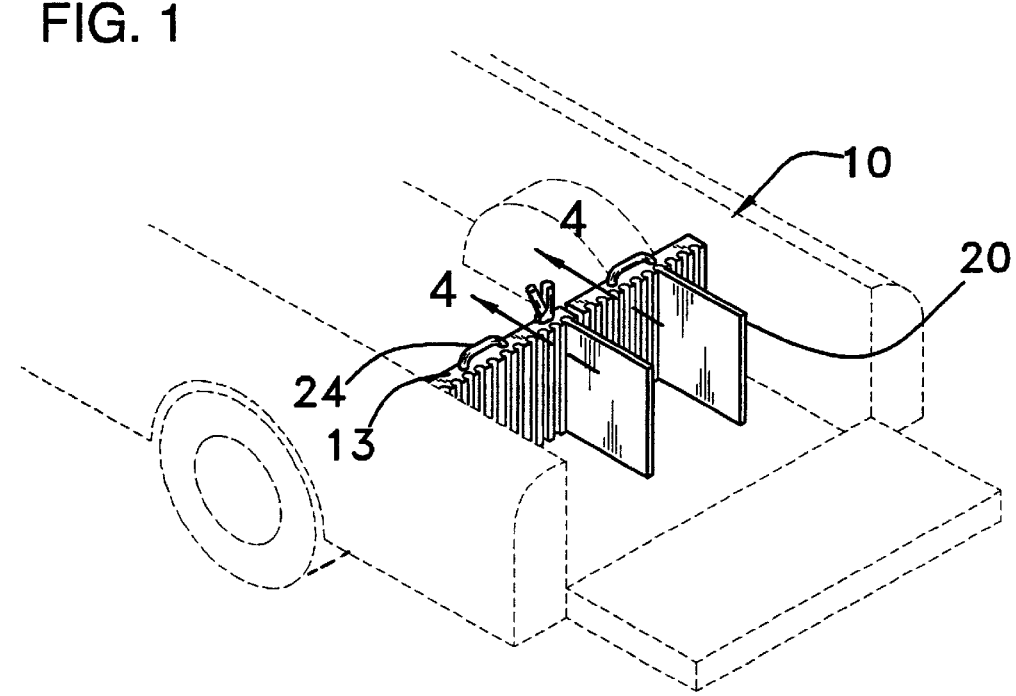
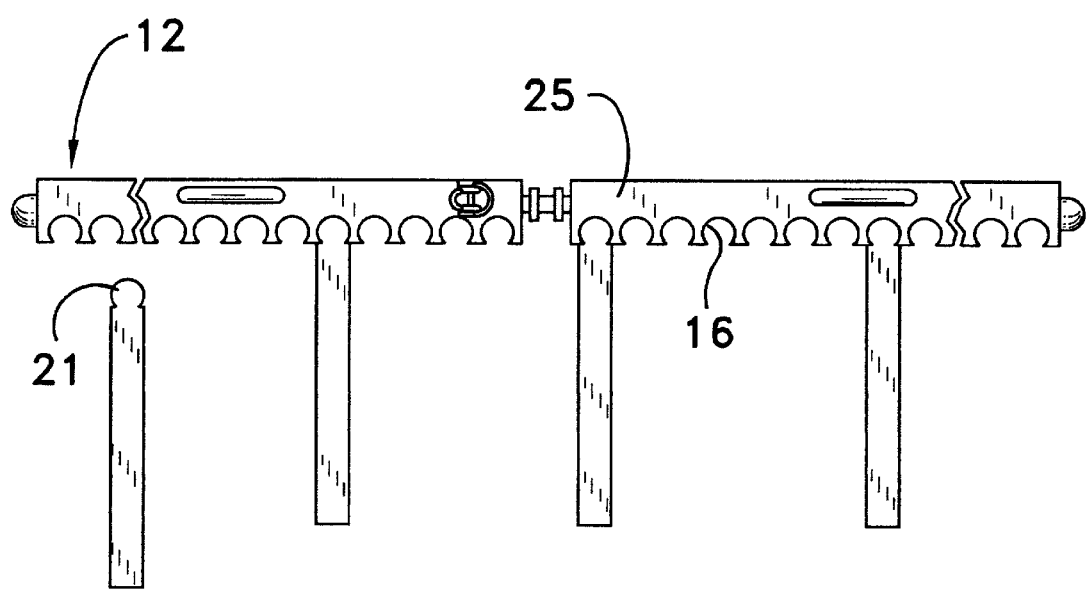
FIG. 2

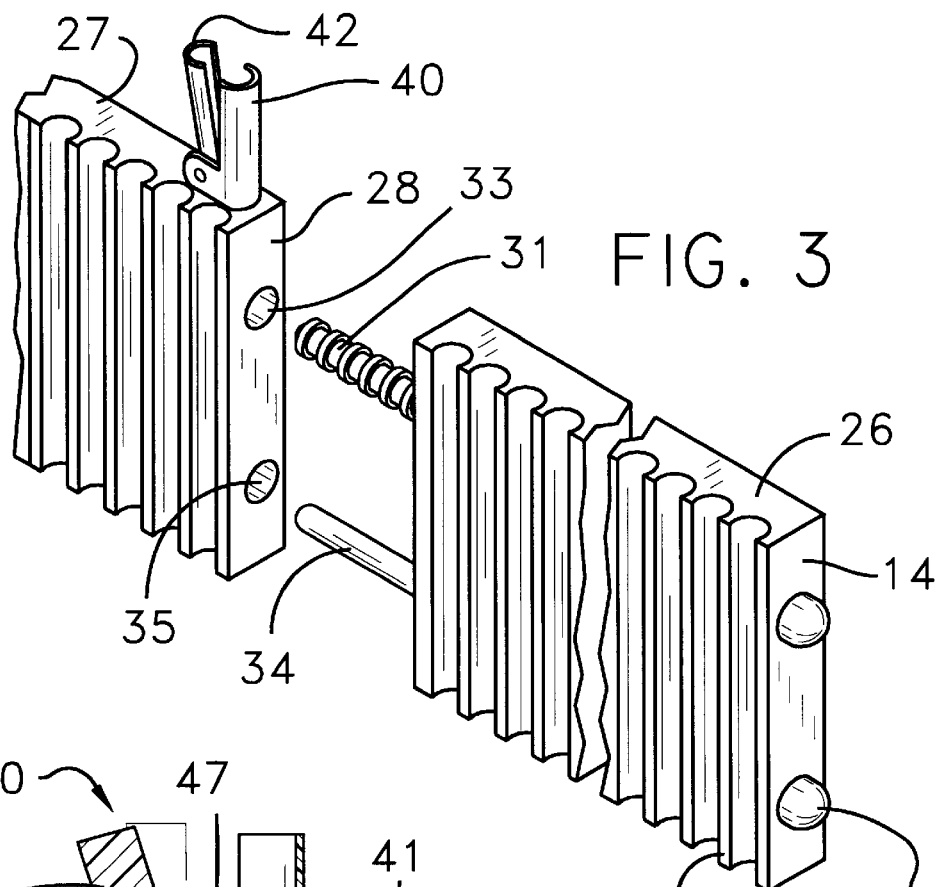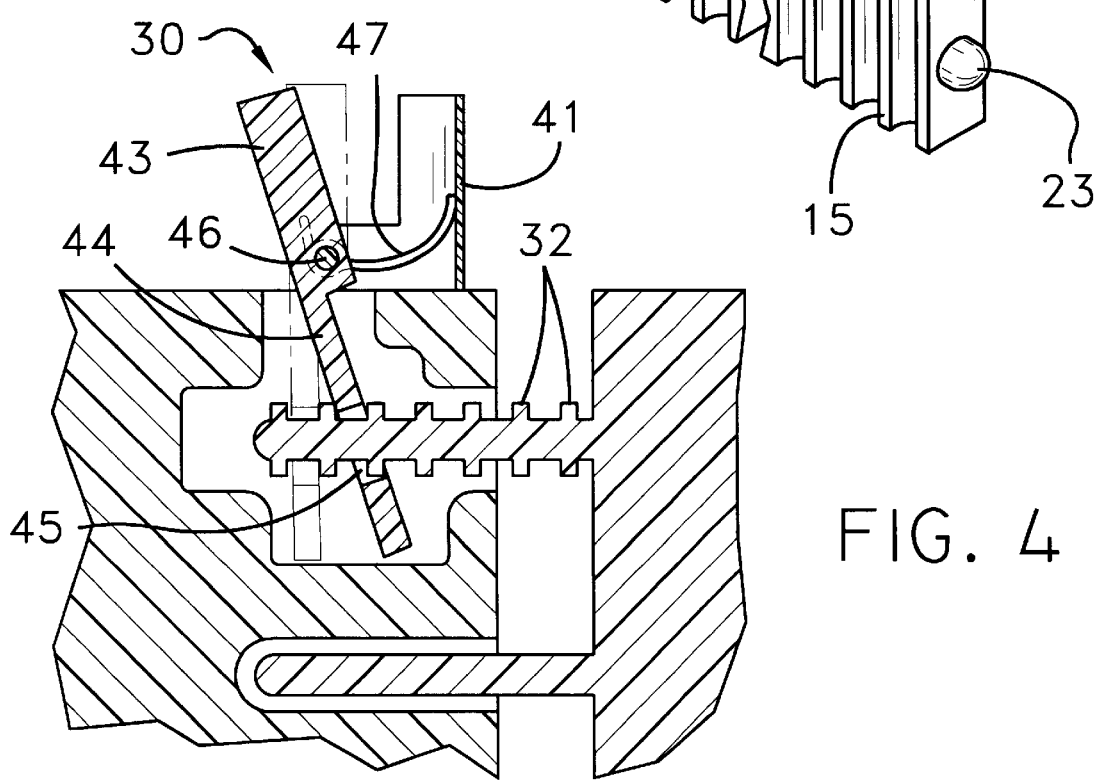

ADJUSTABLE CARGO AREA ORGANIZER SYSTEM

BACKGROUND OF THE INVENTION

1. Field of the Invention

The present invention relates to organizers and more particularly pertains to a new adjustable cargo area organizer system for adjustably organizing a cargo area of a vehicle having at least a pair of opposed side walls orientated generally parallel to each other.

2. Description of the Prior Art

In recent years the versatility of vehicles having a cargo area have increased tremendously. These vehicles have drawn the attention of user that are looking for durable and versatile vehicles. These users often use these vehicles for carrying and hauling goods such as, groceries, tools, lumber and machinery. The problem that has been encountered with these types of vehicles is that the goods tend to move about the cargo area when the vehicle is in motion. In fact, unsecured goods can become damaged or they can damage the vehicle.

There have been numerous inventions to divide cargo areas of vehicles in order to limit the movement of goods being transported. However, the prior inventions have several disadvantages. First, they are generally bulky, heavy and difficult to move. Second, they are generally not adjustable to various vehicles, therefore once the invention is installed in a particular vehicle it cannot be used in another vehicle. Lastly, the prior inventions typically require that a portion of the invention be mounted to the vehicle by some type of fastener. The installation method also made it difficult to use the invention in various vehicles.

The use of organizers is known in the prior art. More specifically, organizers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,167,434; U.S. Pat. No. 5,240,301; U.S. Pat. No. 4,887,947; U.S. Pat. No. 5,265,993; U.S. Pat. No. 6,109,847; and U.S. Pat. No. Des. 350,526.

While these devices fulfill their respective, particular objectives and requirements, the aforementioned patents do not disclose a new adjustable cargo area organizer system. The inventive device includes a partition assembly for portioning the cargo area of a vehicle into compartments. The partition assembly includes at least one panel that has a pair of opposed first end surfaces. Each of the opposed first end surfaces is selectively abuttable against the pair of opposed side walls of the vehicle. The panel has a front surface that has at least one elongated channel extending therein. At least one divider is provided that has an end that is slidably secured in the elongated channel. The divider subdivides one of the compartments of the cargo area into sub-compartments.

In these respects, the adjustable cargo area organizer system according to the present invention substantially departs from the conventional concepts and designs of the prior art, and in so doing provides an apparatus primarily developed for the purpose of adjustably organizing a cargo area of a vehicle having at least a pair of opposed side walls orientated generally parallel to each other.

SUMMARY OF THE INVENTION

In view of the foregoing disadvantages inherent in the known types of organizers now present in the prior art, the present invention provides a new adjustable cargo area organizer system construction wherein the same can be utilized for adjustably organizing a cargo area of a vehicle having at least a pair of opposed side walls orientated generally parallel to each other.

The general purpose of the present invention, which will be described subsequently in greater detail, is to provide a new adjustable cargo area organizer system apparatus and method which has many of the advantages of the organizers mentioned heretofore and many novel features that result in a new adjustable cargo area organizer system which is not anticipated, rendered obvious, suggested, or even implied by any of the prior art organizers, either alone or in any combination thereof.

There has thus been outlined, rather broadly, the more important features of the adjustable cargo area organizer system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new adjustable cargo area organizer system apparatus and method which has many of the advantages of the organizers mentioned heretofore and many novel features that result in a new adjustable cargo area organizer system which is not anticipated, rendered obvious, suggested, or even implied by any of the prior art organizers, either alone or in any combination thereof.

Still another object of the present invention is to provide a new adjustable cargo area organizer system for adjustably organizing a cargo area of a vehicle having at least a pair of opposed side walls orientated generally parallel to each other.

Still yet another object of the present invention is to provide a new adjustable cargo area organizer system that is easily transportable and that can be easily transferred between vehicles.

Even still another object of the present invention is to provide a new adjustable cargo area organizer system that is used to organize goods of different sizes and shapes while preventing the goods from being damaged or damaging the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new adjustable cargo area organizer system according to the present invention.

FIG. 2 is a top planar view of the present invention.

FIG. 3 is a perspective view of the present invention.

FIG. 4 is a fractional cross sectional view of the present invention taken along line 4—4 of FIG. 1.

DESCRIPTION OF THE PREFERRED EMBODIMENT

With reference now to the drawings, and in particular to FIGS. 1 through 4 thereof, a new adjustable cargo area organizer system embodying the principles and concepts of the present invention and generally designated by the reference numeral 10 will be described.

As best illustrated in FIGS. 1 through 4, the adjustable cargo area organizer system 10 generally comprises a partition assembly 12 for partitioning the cargo area of a vehicle into compartments. The partition assembly 12 includes at least one panel 13 that has a pair of opposed first end surfaces 14. Each of the opposed first end surfaces 14 is selectively abuttable against a pair of opposed side walls of a vehicle.

The panel 13 has a front surface 15 and a rear surface. The front surface 15 has at least one elongated channel 16 extending therein. The elongated channel 16 has a longitudinal axis orientated generally perpendicular to a longitudinal axis of the panel 13 and is orientated generally perpendicular to a floor of the vehicle. In one embodiment of the present invention, the channel 16 of the panel 13 may include a plurality of elongated channels with each of the elongated channels being orientated generally perpendicular to and spaced apart along the longitudinal axis of the panel 12. A plurality of intermediate walls may extend away from the front surface 15 of the panel 13 defining each of the elongated channels 16.

In one embodiment of the present invention, the elongated channel preferably has a generally semi-circular transverse cross section taken substantially perpendicular to the longitudinal axis of the channel 16. However, the panel 13 may employ channels 16 of various sizes and shapes.

The panel 13 may have a height measuring approximately ten to eleven inches. The panel 13 may also measure approximately two inches between the front 15 and rear surfaces. However, the panel 13 may be manufactured in a variety of sizes and shapes.

As illustrated in FIGS. 1, 2 and 3, at least one divider 20 that has an end 21 that is slidably securable in the elongated channel 16 for subdividing one of the compartments of the cargo area into sub-compartments. In one embodiment of the present invention, the one divider 20 includes a plurality of dividers. Each of the dividers 20 is preferably slidably securable in each of the plurality of elongated channels 16.

The divider 20 may measure approximately twelve inches along a longitudinal axis of the divider 20. The divider 20 may also have a thickness measuring approximately one-half to three-quarters inches. However, the divider 20 may be manufactured in a variety of shapes and sizes.

In one embodiment of the present invention, the end 21 of the divider 20 has a generally semi-circular transverse cross section taken substantially perpendicular to a longitudinal axis of the divider 20 for slidably securing and mating of the divider 20 with the elongated channel 16. A pair of opposed elongated grooves may be positioned generally adjacent to the end 21 of the divider 20. Each of the grooves may selectively abut the intermediate wall defining the elongated channels for supporting the divider 20 positioned in the elongated channel and preventing the divider 20 from pivoting with respect to the panel 13.

As particularly illustrated in FIG. 3, a means for cushioning 23 the opposed first end surfaces 14 of the panel 13 of the partition assembly 12 may be provided. The means for cushioning 23 the pair of first end surfaces 14 may be mounted on each of the first end surfaces 14 of the panel 13. In one embodiment of the present invention, the means for cushioning 23 the pair of first end surfaces 14 of the panel 13 may comprise a resiliently flexible material such as, for example, a rubber or plastic material. The means for cushioning 23 the opposed first end surfaces 14 may comprise at least one generally rounded foot member. However, the means for cushioning the opposed first end surfaces 14 of the panel 13 may be manufactured in any size and shape.

As illustrated in FIGS. 1 and 2, a means for carrying 24 the partition assembly 12 is mounted on the panel 13 of the partition assembly 13. In one embodiment of the present invention, the means for carrying 24 the partition assembly 12 may comprise at least one generally arcuate member having ends that are mounted on an upper end surface 25 of the panel 13.

In an alternate embodiment of the present invention, the at least one panel 13 includes a first panel portion 26 and a second panel portion 27 telescopically coupled together for adjustably extending and retracting each of the panel portions 26 and 27 between the pair of opposed side walls of the vehicle. In the alternate embodiment of the present invention, the elongated channels 16 extend into each of the panel portions 26 and 27

As illustrated in FIG. 3, each of the panel portions 26 and 27 includes a second end surface 28 opposite the first end surface 14 of the panel 13. The second end surfaces 28 of each of the panel portions 26 and 27 are positioned generally adjacent to each other and are selectively abuttable against each other.

As particularly illustrated in FIG. 4, a means of extending and retracting 30 the panel portions 26 and 27 with respect to each other is mounted on the second of the panel portions 27 and operationally coupled to the second panel portion 26.

In one embodiment of the present invention, the means of extending and retracting 30 each of the panel portions 26 and 27 may include a first elongated shaft member 31 that is mounted on and extending away from the second end surface 28 of the first panel portion 27. A plurality of spaced teeth members 32 may be mounted on and extending away from the first shaft member 31. The first shaft member 31 is telescopically insertable in an opening extending into the second end surface 28 of the second panel portion 27.

A second shaft member 34 may be mounted on and extending perpendicularly away from the second end surface 28 of the first panel portion 26 such that the first 31 and second 34 shaft members are orientated generally parallel to each other. The second end surface 28 of the second panel portion 27 may have an opening 35 extending into the second end surface 28 of the second panel portion 27 for telescopically receiving the second shaft member A ratchet 40 may be mounted on and extending into the upper end surface 25 of the second panel portion 27 for selectively engaging the first shaft member 31. In one embodiment of the present invention, the ratchet 40 may include a handle member 41 that is statically mounted on the upper end surface 25 of the second panel portion 27 for receiving a palm of a user. In one embodiment of the present invention, the handle member 41 has a generally arcuate transverse cross section taken substantially perpendicular to a longitudinal axis of the handle member 41.

The ratchet 40 may also include a lever member 42 that has a handle portion 43 that is pivotally coupled to the handle member 41 for receiving the phalanges of a user and a pawl portion 44 extending into the second panel portion 27. The pawl portion 44 has a hole 45 extending therethrough for selectively receiving the first shaft member 31. In one embodiment of the present invention, the handle portion 43 of the lever member may have a generally arcuate transverse cross section taken substantially perpendicular to longitudinal axis of the lever member 42.

In one embodiment of the present invention, the pawl portion 44 engages the plurality of teeth 32 when a user squeezes the handle member 41 and the handle portion 43 of the lever member 42 together and ratchets the first 26 and second 27 panel portions away from each other.

As illustrated in FIG. 4, a coupling member 46 extends through the handle member 41 and through the handle portion 43 of the lever member 42 for pivotally coupling the lever member 42 and the handle member 41 together. The coupling member 46 may comprise a generally cylindrical pin.

As also illustrated in FIG. 4, a means of biasing 47 the handle portion 43 of the lever member 42 and the handle member 41 away from each other may be mounted about the coupling member 46 and may selectively abut an inner surface of the handle member 41. The means of biasing 47 the handle portion 43 of the lever member 42 and the handle member 41 away from each other may comprise a coil spring.

In use, the panel 13 is positioned in the cargo area of the vehicle with the first end surfaces 14 positioned generally adjacent to the opposed side walls of the vehicle. A user then grasps and squeezes together the handle member 41 and handle portion 43 of the lever member 42. Repeated squeezing and releasing by the user causes the pawl portion 44 of the lever member 42 to selectively engage the plurality of teeth 32 mounted on the first shaft member 31. The repeated squeezing and releasing motion telescopically extends the first shaft member 31 out of the opening 33 forcing the first 26 and second 27 panel portions away from each other securing the panel 13 between the pair of opposed side walls of the vehicle.

The user then inserts the end 21 of the divider into the elongated channel 16 for dividing a compartment created by the panel 13 into sub-compartments. The panel may be positioned generally a distance equal to a length of the divider away from a tail gate of a vehicle to permit the user to raise or lower the tailgate in order to more easily insert goods into the sub-compartments and to use the tailgate to partition off the sub-compartments and prevent the goods from moving about the cargo area.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the adjustable cargo area organizer system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable cargo area organizer system for a cargo area of a vehicle, the vehicle having at least a pair of opposed side walls being orientated generally parallel to each other, said system comprising:

a partition assembly for portioning the cargo area into compartments, said partition assembly including at least one panel having a pair of opposed first end surfaces, each of said opposed first end surfaces being selectively abuttable against the pair of opposed side walls of the vehicle, said panel having a front surface, said front surface having at least one elongated channel extending therein;

at least one divider having an end being slidably secured in said elongated channel for subdividing one of the compartments of the cargo area into a sub-compartment; and a means for carrying said partition assembly being mounted on said panel of said partition assembly, wherein said means for carrying said partition assembly comprises at least one generally arcuate member being mounted on an upper end surface of said panel.

2. An adjustable cargo area organizer system of for a cargo area of a vehicle, the vehicle having at least a pair of opposed side walls being orientated generally parallel to each other, said system comprising:

a partition assembly for portioning the cargo area into compartments, said partition assembly including at least one panel having a pair of opposed first end surfaces, each of said opposed first end surfaces being selectively abuttable against the pair of opposed side walls of the vehicle, said panel having a front surface, said front surface having at least one elongated channel extending therein, wherein said at least one channel has a generally semi-circular transverse cross section taken substantially perpendicular to a longitudinal axis of said at least one channel; and at least one divider having an end being slidably secured in said elongated channel for subdividing one of the compartments of the cargo area into a sub-compartment.

3. An adjustable cargo area organizer system for a cargo area of a vehicle, the vehicle having at least a pair of opposed side walls being orientated generally parallel to each other, said system comprising:

a partition assembly for portioning the cargo area into compartments, said partition assembly including at least one panel having a pair of opposed first end surfaces, each of said opposed first end surfaces being selectively abuttable against the pair of opposed side walls of the vehicle, said panel having a front surface, said front surface having at least one elongated channel extending therein, wherein said at least one channel of said at least one panel includes a plurality of elongated channels, each of said plurality of elongated channels being orientated generally perpendicular to and spaced apart along a longitudinal axis of said at least one panel; and at least one divider having an end being slidably secured in said elongated channel for subdividing one of the compartments of the cargo area into a sub-compartment, wherein said at least one divider includes a plurality of dividers, each of said dividers being slidably secured in a respective one of said plurality of elongated channels, wherein said end of said dividers has a generally semi-circular transverse cross section taken substantially perpendicular to a longitudinal axis of said dividers for being slidably secured in said channels.

4. An adjustable cargo area organizer system for a cargo area of a vehicle, the vehicle having at least a pair of opposed side walls being orientated generally parallel to each other, said system comprising:

a partition assembly for portioning the cargo area into compartments, said partition assembly including at least one panel having a pair of opposed first end surfaces, each of said opposed first end surfaces being selectively abuttable against the pair of opposed side walls of the vehicle, said panel having a front surface, said front surface having at least one elongated channel extending therein;

wherein said at least one panel includes a first panel portion and a second panel portion slidably coupled together for adjustably extending and retracting each of said panel portions between the pair of opposed side walls of the vehicle;

wherein each of said panel portions includes a plurality of elongated channels;

wherein each of said panel portions includes a second end surface opposite a first end surface;

at least one divider having an end being slidably secured in said elongated channel for subdividing one of the compartments of the cargo area into a sub-compartment; and a means of extending and retracting said panel portions with respect to each other being mounted on said second of said panel portions and operationally coupled to said first panel portion.

5. The adjustable cargo area organizer system of claim 4, wherein said means of extending and retracting each of said panel portions includes:

a first elongated shaft member being mounted on and disposed perpendicularly away from said second end surface of said first panel portion;

a plurality of spaced teeth members being mounted on said first shaft member;

said first shaft member being telescopically positioned in an opening extending into said second end surface of said second panel portion; and a ratchet being mounted on and extending into said second panel portion for selectively engaging said first shaft member.

6. The adjustable cargo area organizer system of claim 5, additionally including a second shaft member being mounted on and perpendicularly disposed on said second end surface of said first panel portion; and said second end surface of said second panel portion having an opening for telescopically receiving said second shaft member.

7. The adjustable cargo area organizer system of claim 5, wherein said ratchet includes:

a handle member being statically mounted on an upper end surface of said second panel portion for receiving a palm of a user; and a lever member having a handle portion being pivotally coupled to said handle member for receiving phalanges of a user and a pawl portion extending into said second panel portion, said pawl portion having a hole extending therethrough for selectively receiving said first shaft member, wherein said pawl portion engages said plurality of teeth when a user squeezes said handle member and said handle portion of said lever member, wherein said first and second panel portions are ratcheted away from each other.

8. The adjustable cargo area organizer system of claim 7, additionally including a coupling member extending through said handle member and through said handle portion of said lever member for coupling said lever member and said handle member together.

9. The adjustable cargo area organizer system of claim 8, additionally including a means of biasing said handle portion of said lever member and said handle member away from each other being mounted on said coupling member and selectively abutting said handle member.

10. The adjustable cargo area organizer system of claim 7, wherein said handle member has a generally arcuate transverse cross section taken substantially perpendicular to a longitudinal axis of said handle member.

11. The adjustable cargo area organizer system of claim 7, wherein said handle portion of said lever member has a generally arcuate transverse cross section taken substantially perpendicular to a longitudinal axis of said lever member.

* * * * *